United States Patent [19]

Jacobs et al.

[11] 4,088,420

[45] May 9, 1978

[54] WIND ELECTRIC PLANT

[76] Inventors: Marcellus L. Jacobs; Paul R. Jacobs, both of Rte. 13, Box 722, Fort Myers, Fla. 33901

[21] Appl. No.: 681,227

[22] Filed: Apr. 28, 1976

Related U.S. Application Data

[63] Continuation-in-part of Ser. No. 645,832, Dec. 31, 1975, abandoned, which is a continuation-in-part of Ser. No. 624,281, Oct. 20, 1975, abandoned.

[51] Int. Cl.² .............................................. F03D 7/04
[52] U.S. Cl. .................................. 416/9; 416/146 A; 416/170 R
[58] Field of Search ................ 416/9, 146 A, DIG. 4, 416/170 R

[56] References Cited

U.S. PATENT DOCUMENTS

| | | | |
|---|---|---|---|
| 508,852 | 11/1893 | Snow | 416/9 |
| 756,616 | 4/1904 | Fornander | 416/9 |
| 1,533,467 | 4/1925 | Sargent | 416/DIG. 4 |
| 1,767,303 | 6/1930 | Miller | 416/DIG. 4 |
| 2,169,165 | 8/1939 | Reedy | 416/9 |
| 2,352,089 | 6/1944 | Fagerlund | 416/9 |
| 2,360,791 | 10/1944 | Putnam | 416/DIG. 4 |
| 2,454,058 | 11/1948 | Hays | 60/398 |
| 2,505,969 | 5/1950 | Jacobs | 416/61 X |
| 2,655,604 | 10/1953 | Hutter | 416/136 X |

*Primary Examiner*—Everette A. Powell, Jr.
*Attorney, Agent, or Firm*—Shoemaker and Mattare, Ltd.

[57] ABSTRACT

A multiblade, wind-driven, variable pitch propeller is supported on a tower for rotation by wind forces and is connected through gears to drive an electrical generator or the like to produce electrical energy. The gears include a ring and pinion arranged in a gear case so that wind forces acting on the propeller and torque forces produced in the gears are balanced, thus avoiding swinging movement of the propeller about the tower axis due to unbalanced forces and thereby keeping the propeller axis pointed into the wind. The pinion gear is engaged with the ring gear at a location spaced near the top of the ring gear and a pinion shaft sleeve is disposed around the pinion shaft and sealed to a bottom portion of the gear case to effect a gear lubricant seal therewith, thus eliminating the requirement for an oil seal between the pinion shaft and gear case, with concomitant elimination of the oil seal drag, and also eliminating friction drag of the gear lubricant itself on the pinion shaft. Further, the danger of damage to the components in the event of loss of gear lubricant from the gear case is avoided by provision of the pinion shaft sleeve.

7 Claims, 5 Drawing Figures

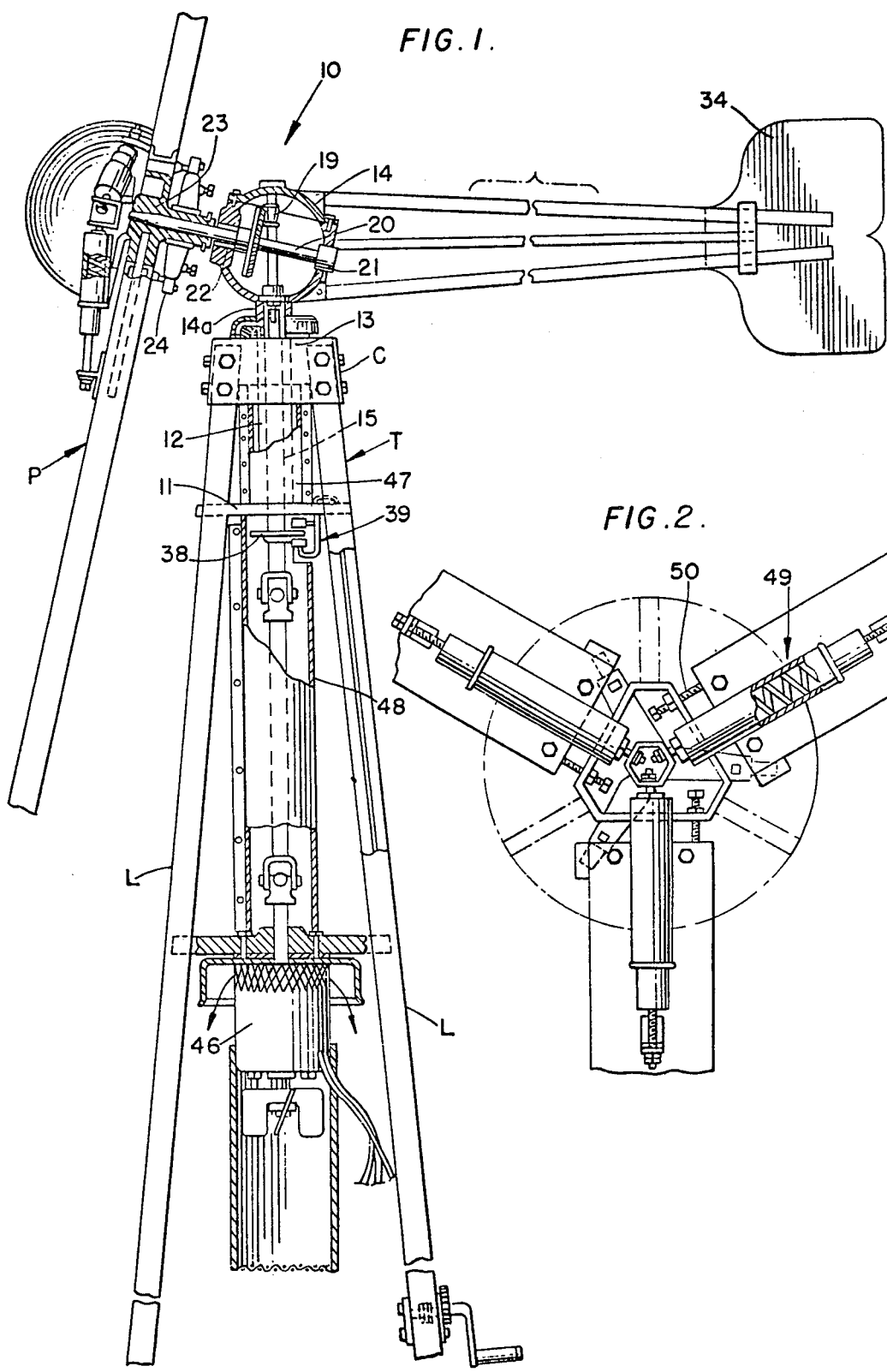

WIND ELECTRIC PLANT

BACKGROUND OF THE INVENTION

This application is a continuation-in-part of Application Ser. No. 645,832, filed Dec. 31, 1975, which is, in turn, a continuation-in-part of Application Ser. No. 624,281, filed Oct. 20, 1975, now abandoned.

This invention relates in general to a wind energy power system of the type using a multiblade propeller for producing power from wind energy. More particularly, the invention relates to a multiblade, wind-driven, variable pitch propeller supported at the top of a tower and connected through a gear arrangement for driving an output shaft supported on the tower. The output shaft may be connected to power a pump for pumping water, or for operating a compressor for refrigeration or other uses, or for the production of mechanical power for any desired use. Specifically, the invention relates to a system as above, wherein the propeller is used to drive an electric generator for the generation of electrical energy.

In the prior art, many different types of wind electric plants have been provided for generating electrical power from wind energy, as exempliefied, for example, in U.S. Pat. Nos. 1,979,616, 2,050,142, 2,096,860, 2,464,234 and 2,505,969. Some of the wind electric plants disclosed in these prior art patents utilize variable pitch propeller blades, which are automatically governed or self-regulating for changing wind conditions. However, prior art wind electric plants typically have relatively small diameter propellers, as, for example, on the order of about 10 feet in diameter, and accordingly, the forces encountered are relatively small and easy to handle. For example, pitch adjusting structures and blade stop means can be accommodated through various parts of the governor structure, and pitch changes of the propeller blades can be accomplished at all operating speeds of the wind plants. Also, installation and service of such prior art systems is relatively easy to accomplish, since spring forces and propeller blade sizes and weights and the like are relatively small and thus easy to handle.

Recently, however, there has been increasing demand for larger propellers for production of greater amounts of horsepower and electrical energy output. Such larger propellers, for example, range upward to about 25 feet in diameter. At these propeller sizes, conventional structures and arrangements and pitch adjusting features are not capable of withstanding the loads encountered. Further, the propeller blades must be repositioned in order to afford adequate clearance thereof with the supporting tower. Moreover, it has been found that with these larger propeller blades, changes in pitch could not be effectively accomplished with conventional structures, and damage to the propeller blades results at higher wind velocities. Additionally, with the larger propellers, greater amounts of torque are encountered, and conventional spring arrangements are not capable of controlling the blade operation, and further, failure of the spring mounting bolts frequently occurs after a short period of use. Still further, conventional blade adjusting structures are not suitable for use with the larger propeller blades, and more direct attachment and engagement of the blade pitch adjusting bolts and blade return stop bolts is required.

Additionally, in wind electric plants utilizing such large propellers, substantial torque forces are created in the gears, tending to cause the propeller to swing about the tower axis, thus causing misalignment between the propeller axis and wind direction, with a resultant loss in power. Further, drag between the ground and wind produces wind shear forces, causing the wind adjacent the ground to curl or turn downward toward the ground, producing misalignment between the wind direction and propeller axis. Still further, in conventional structures, an oil seal is required between the pinion shaft and gear case at the bottom of the gear case, and if the oil seal is damaged, the loss of lubricant can very rapidly result in the destruction of the plant. Moreover, the friction drag of the oil seal on the pinion shaft is relatively high, and when air foil type propellers are used, the plant will not readily start in light winds. In fact, the drag of an oil seal requires 3 to 4 miles per hour higher wind velocities to start the plant than for a plant not having the oil seal. The drag of the oil itself around the pinion shaft also creates a power loss, particularly in cold climates.

Therefore, in accordance with the present invention, a unique wind electric plant is provided which is constructed to withstand the larger forces encountered when larger propellers are used, and means are provided to effectively solve all of the problems set forth above, which are found with many prior art devices.

OBJECTS OF THE INVENTION

It is, therefore, an object of this invention to provide in a wind electric plant of the type having a wind-driven multiblade propeller supported at the top of a tower and connected through a gear arrangement for driving an electric generator, a ring and pinion gear set, wherein the ring gear is eccentrically disposed relative to the axis of the pinion gear, such that the torque forces imparted through the ring and pinion gear are at least partially balanced or offset by the wind forces acting on the propeller, to thus prevent misalignment of the propeller axis relative to the direction of prevailing wind forces, and wherein the pinion gear is engaged with the ring gear near the top thereof, and the pinion shaft is surrounded by a sheath or sleeve to thus eliminate the need for a separate oil seal.

Another object of the invention is to provide a wind electric plant of the type including a propeller driven gear means, wherein the gear means includes a ring gear and meshed hypoid bevel gear, wherein the bevel gear is engaged at the top of the ring gear so as to be positioned above oil in the gear case, to reduce friction losses, particularly in cold climates, and wherein a sleeve surrounds the bevel gear shaft and extends to above the level of oil in the gear case, thus eliminating the need for a separate oil seal and also shielding the shaft from the oil.

BRIEF DESCRIPTION OF THE DRAWINGS

FIG. 1 is a fragmentary view in elevation, with portions broken away and portions shown in section, of a wind electric plant incorporating the features of the present invention.

FIG. 2 is an enlarged, fragmentary front view of the portion of the propeller near the hub of the device in FIG. 1, with the hub cover or fairing cone shown in phantom lines for purposes of illustration.

DETAILED DESCRIPTION OF THE PREFERRED EMBODIMENTS

Figure 3:
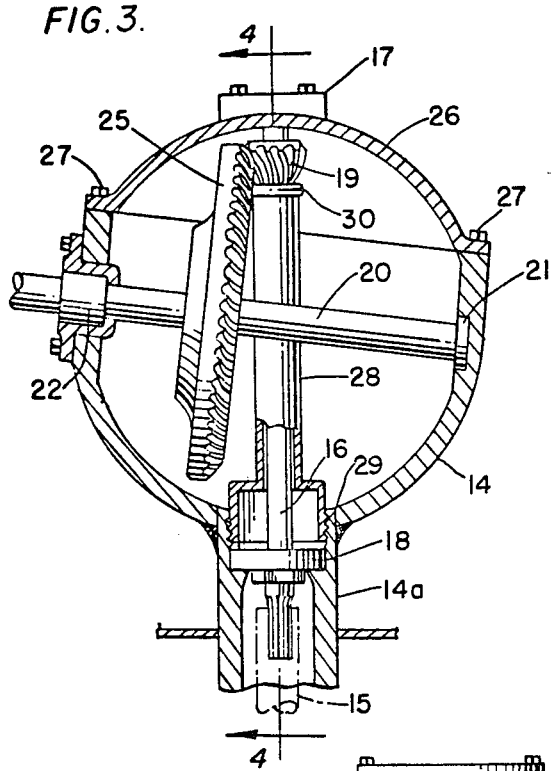
FIG. 3 is an enlarged, fragmentary view in section of a gear case and gear means incorporating the invention therein.

In the drawings, wherein like reference numerals indicate like parts throughout the several views, a first form of wind electric plant in accordance with the invention is indicated generally at 10 and comprises a support tower T on which a multiblade, variable pitch propeller P is supported.

The tower T is of substantially conventional construction, and includes a plurality of legs L converging toward one another at their upper ends and having a tower cap C secured thereon. A transverse plate 11 is suitably secured to the legs of the tower spaced downwardly from the tower cap C and an upstanding mast pipe 12 is suitably attached at its lower end to the plate 11 and extends upwardly therefrom through the tower cap C and through a turn bearing 13. A gear case 14 has an extension 14a thereon which extends downwardly into the upper end of the mast pipe to support the gear case on the top of the tower. In other words, the plate 11 is rigidly and securely fixed to the tower, and the mast pipe is attached at its lower end to the plate 11 and connected at its upper end to the case 14, so that the case is supported on the tower for rotating movement about the axis of the tower, but is prevented from lateral displacement relative thereto.

Figure 4:
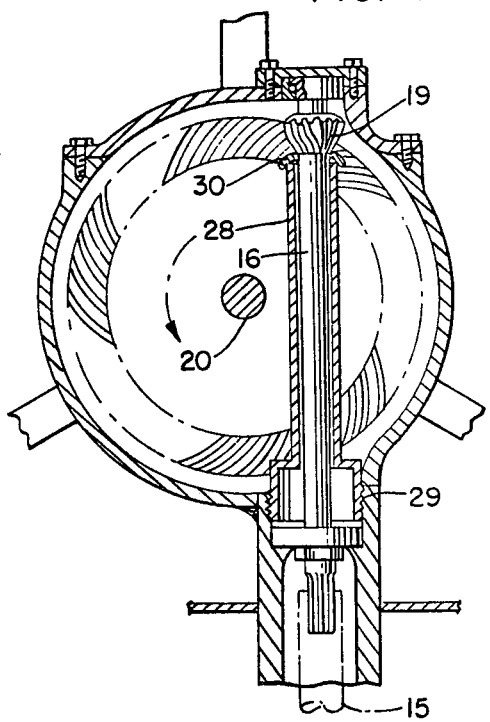
FIG. 4 is a view in section taken along line 4—4 in FIG. 3.

A drive shaft 15 extends coaxially within the mast pipe 12 and is rotatable relative thereto and extends upwardly at its upper end through the upper end of the mast pipe and is suitably connected, as through a splined connection, or the like, for example, with the lower end of a pinion shaft 16 rotatably supported in bearings 17 and 18 at the top and bottom, respectively, of the gear case. As seen in FIG. 4, the pinion shaft is offset to one side of the center line of the gear case. A pinion gear or hypoid bevel gear 19 is on the upper end of shaft 16.

Figure 5:
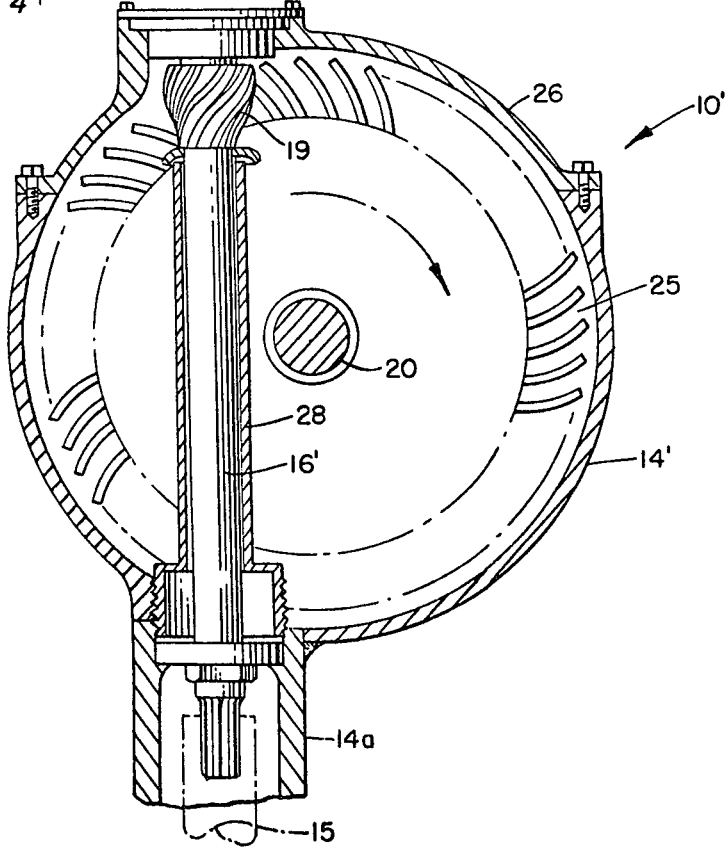
FIG. 5 is a further enlarged view, similar to FIG. 4, of a modification of the invention, wherein the ring gear (and propeller) turn clockwise, when viewed from the rear.

A propeller shaft 20 extends through the gear case 14 and is inclined to the axis of the tower (about 9° from the horizontal in a preferred form) and offset laterally to one side of the axis of drive shaft 15, as seen in FIGS. 4 and 5. The propeller shaft 20 is supported in bearings 21 and 22 in the rear and front walls, respectively, of the gear case 14, and extends forwardly of the gear case and has a propeller hub 23 secured thereon and an automatic, pitch adjusting governor arrangement 24 of the type disclosed, for example, in U.S. Pat. No. 2,505,969 or co-pending Application Ser. Nos. 477,316 and 645,832. A ring gear 25 is carried by the shaft 20 within the case 14 in operative engagement with the pinion 19 for driving the pinion gear whenever the propeller shaft is rotated by the propeller P.

A gear case cover 26 is removably attached to the top of the gear case for gaining access to the interior thereof when desired or necessary, and the cover is secured in place by removable fasteners 27, such as stud bolts or the like.

An open-ended tube or sleeve 28 formed of a suitable material, such as steel or the like, is threadably engaged at its lower end 29 with mating threads on the inner surface of the upper end of the case extension 14a and extends upwardly to immediately beneath the pinion or hypoid bevel gear 19 in coaxial, surrounding relationship to the pinion shaft 16. An inverted, cup-shaped oil deflector 30 is secured to the pinion shaft immediately below the pinion gear or hypoid bevel gear 19 for deflecting or diverting gear lubicant outwardly over the outside of the sleeve 28. With this arrangement, it is not necessary to provide an oil seal between the gear case and pinion shaft at the bottom of the gear case, and accordingly, the drag normally imposed on the pinion shaft by the oil seal is eliminated. Additionally, the sleeve 28 prevents the gear lubricant or oil from contacting the shaft, with the result that the frictional drag of the oil on the shaft is eliminated, and this can be significant in cold climates. In connection with the above, enough gear lubricant is carried upwardly by the ring gear to maintain proper lubrication between the ring gear and pinion gear or hypoid bevel gear.

The modified structure indicated generally at 10' in FIG. 5 is substantially identical with that previously described, except that the pinion, pinion shaft and related structure are disposed on the opposite side of the propeller shaft 20 from that shown in FIGS. 3 and 4, and in this form of the invention, the propeller and ring gear rotate clockwise when viewed from the rear, rather than counterclockwise when viewed from the rear, as in the FIGS. 3 and 4 embodiment.

The remaining structure of the wind electric plant is identical to that illustrated and described in the aforesaid patent applications, and includes a disc brake rotor carried by the drive shaft 15 and disc brake caclipers 39 carried by the tower for cooperation therewith. Weather shields 47 and 48 are also disposed around the drive shaft, as in the aforesaid pending patent applications, and a generator 46 is supported by the tower and is connected to be driven by the propeller P. Additionally, blade return spring means 49 and associated blade stop means 50 are connected with the propeller blades in the manner and for a purpose as fully described in the aforesaid co-pending patent applications.

Propeller blades in accordance with the present invention may range upwardly of about 25 feet in diameter, and thus very large forces are created, and in fact, the spring force necessary to properly control such large propeller blades may approach or even exceed 4,000 pounds. Accordingly, the unsuitability of conventional structures is readily apparent. Additionally, with the large propeller sizes contemplated by the present invention, most of the problems encountered in wind electric plants are magnified in comparison with conventional prior art arrangements, and in fact, the offset arrangement of the ring and pinion gear, as shown in FIGS. 3-5, is necessary in order to effect a balance between the torque forces generated between the ring and pinion gears and the wind forces imposed on the propeller. In other words, the propeller blades used in apparatus like the present invention are highly efficient, and very little wind force is present behind the propeller, with the result that the tail vane 34 has little appreciable effect until a high angular displacement occurs. With the present invention, the apparatus, when using a propeller having a diameter of about 20 feet, is capable of generating about 20 horsepower, and accordingly, the torque forces between the ring and pinion gears are quite large, with the result that the propeller or ring gear tends to "walk" around the pinion gear, thus effecting a misalignment or improper angle of attack of the propeller relative to the wind direction. The offset as shown in FIGS. 3-5 effectively and efficiently solves this problem, since the wind force on the large propeller imparts a movement or torque in a direction opposite that of the torque created between the ring and pinion gears, with the result that the tendency of the ring gear to walk around the pinion gear is offset or balanced. Further, on propellers of the size contemplated by the present invention, there is a problem of flutter of the propeller tips during rapid pitch changes, with the result that the propeller blades are destroyed. This is apparent when it is considered that at the higher wind velocities the propeller tips are traveling well over 150 miles per hour, and during a rapid pitch change, the air foil effect is disrupted, causing flutter or hunting of the propeller tips. The snubbers on the spring assemblies 49 according to the invention, and fully described in the aforesaid co-pending patent applications, effectively solve this problem.

There are some applications for wind electric plants in cold climates, and in such uses, the oil or lubricating fluid used in the gear case becomes quite stiff and, therefore, relatively large frictional drag is encountered upon movement of the gears in the cold lubricating fluid. The largest frictional drag is encountered by the pinion or hypoid bevel gear 19 and shaft 16, since it rotates at a much higher speed than the ring gear. In fact, movement of the ring gear does not present a very great problem, since it moves relatively slowly. The ring gear carries ample lubricant with it to the pinion gear to lubricate the same, even though it is positioned above the lubricating fluid, as illustrated in the figures. Further, it should be noted in FIG. 4 that the pinion gear and the pinion shaft are located to the right of the axis of the propeller shaft 20. This arrangement would be utilized, for example, in the event the propeller and ring gear are required to rotate counterclockwise for driving various equipment, and the torque forces between the ring gear and pinion gear are then balanced by the wind forces on the propeller.

In the form of the invention shown in FIG. 5, the axis of the pinion shaft 16' is positioned to the left of the propeller shaft 20 when viewed from the rear, and the hypoid bevel gear 19 engages the ring gear near the top thereof, as before, and for substantially the same reasons. However, this form of the invention is intended for applications in which the propeller and ring gear are required to rotate in a clockwise direction in order to obtain balance between the torque forces created between the ring gear and pinion gear and the wind forces acting on the propeller.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A wind power plant of the type including a support tower and a multiblade, variable pitch propeller supported thereon, the improvement comprising: gear means supported on top of the tower; a propeller shaft connected to the gear means and extending forwardly therefrom at an upwardly inclined angle and parallel to wind direction; multiblade, variable pitch propeller means carried on the propeller shaft and rotatable in a plane perpendicular to wind direction; drive shaft means connected with the gear means and extending downwardly in the tower for connection to suitable means to be driven by the drive shaft means; said gear means including a substantially rounded gear case having a curved top section removably secured thereto, and supported on top of the tower, said propeller shaft supported in bearing means at the front and back of the gear case, a ring gear carried by the propeller shaft inside the gear case between the front and back thereof, and a hypoid bevel gear connected with the drive shaft means and meshed with the ring gear near the top of the ring gear, said drive shaft means disposed with its axis offset to one side of the axis of the propeller shaft so that wind forces on the propeller means tending to push the propeller means around the axis of the tower are balanced by torque forces between the ring gear and hypoid bevel gear; said drive shaft means including a pinion shaft extending downwardly through the bottom of the gear case and supported in bearing means at the top and bottom of the gear case; and a sleeve sealed at its lower end to the gear case and extending upwardly around the pinion shaft in coaxial relation therewith, thus preventing gear lubricant in the gear case from contacting the pinion shaft, and accordingly reducing the friction drag theron and also eliminating the need for an oil seal between the pinion shaft and gear case.

2. A wind power plant as in claim 1, wherein: the axis of the drive shaft means is positioned to the right of the axis of the propeller shaft, when viewed from the rear of the tower.

3. A wind power plant as in claim 1, wherein: the axis of the drive shaft means is positioned to the left of the axis of the propeller shaft, when viewed from the rear of the tower.

4. A wind electric plant as in claim 1, wherein: the gear case has a tubular extension projecting downwardly therefrom; said pinion shaft extends at its lower end coaxially into the extension and extends at its upper end to adjacent the top of the gear case.

5. A wind electric plant as in claim 4, wherein: the sleeve is secured at its lower end to the gear case and extends at its upper end to immediately below the hypoid bevel gear.

6. A wind electric plant as in claim 5, wherein: the sleeve is removably threadably engaged at its lower end with the gear case.

7. A wind electric plant as in claim 6, wherein: the sleeve has a free, open upper end; and an oil deflector is carried by the pinion shaft immediately above the free, open upper end of the sleeve to deflect oil from the interior thereof.

* * * * *